United States Patent Office 3,347,632
Patented Oct. 17, 1967

3,347,632
PROCESS OF PRODUCING HYDROPHILIC
CARBON BLACK
Lynn Parker, West Monroe, La., assignor to Columbian Carbon Company, New York, N.Y., a corporation of Delaware
No Drawing. Filed Aug. 23, 1963, Ser. No. 304,226
7 Claims. (Cl. 23—209.1)

This invention relates to hydrophilic carbon black and more particularly provides a treatment process whereby carbon blacks may be imparted a substantial degree of hydrophilicity.

According to the rather vague classical definition, the term "hydrophilic" means water-liking, or the characteristic of the pigment to preferentially disperse in water rather than in a non-polar organic liquid, such as benzene. A more exact measure of the hydrophilicity of carbon black may be obtained by means of a simple test which I have devised and which will be hereafter referred to herein. According to this test, a strip of chromatographic paper of about ½ inch width is suspended vertically with the lower end thereof being immersed in a 0.4% aqueous dispersion of the carbon black. After a period of 24 hours, the height to which the carbon black rises on the paper above the liquid level is measured. I call this distance, measured in the centimeters, the capillary rise.

As used herein and in the appended claims in reference to the carbon blacks produced in accordance with my invention, the term "hydrophilic carbon black" is intended to designate those carbon blacks which, in a 0.4% aqueous dispersion consisting of only water and black, will exhibit a capillary rise of greater than about 7 cm. when tested by the above-described test.

When tested by this procedure, relatively non-hydrophilic carbon blacks show little if any capillary rise, while hydrophilic carbon blacks, manufactured in accordance with my present invention, show a substantial capillary rise. Furthermore, some carbon blacks heretofore considered hydrophilic according to the classical definition, do not show a capillary rise of above 7 cm. when tested by this procedure.

Presently, there are a great many industrial applications of carbon black which require that the black be uniformly dispersible in water. For instance, aqueous dispersions of carbon black are employed in the manufacture of such materials as plastics, paper, water-based paints, leather goods, inks, rayons, etc. primarily for imparting a grey or black color to the finished composition. Aqueous dispersions of carbon black may also be mixed with rubber latex in the manufacture of carbon black-rubber masterbatches. Furthermore, it has recently been proposed to use an aqueous dispersion of carbon black as a news ink rather than conventional inks consisting of carbon black and a suitable oil, such as mineral oil.

However, the dispersion of carbon black in water presents difficulties since the carbon blacks produced commercially are organophilic in nature, or stated negatively, are not hydrophilic. In order to overcome these difficulties it has heretofore been necessary to mix the black and water under conditions of extreme turbulence and high rates of shear in apparatus such as ball mills, colloid mills and the like, and to add chemical dispersing agents to the aqueous medium. These chemical dispersing agents, besides being expensive, are sometimes objectional from the standpoint of being incompatible with other constituents employed in the application in which the dispersion is ultimately utilized.

My present invention provides a method of treating carbon black to render it hydrophilic and readily and directly dispersible in water without the necessity for resorting to high shear mechanical mixing and/or chemical dispersing aids to effect the dispersion. Another object of this invention is to provide a process for producing a hydrophilic carbon black in a free flowing, substantially dry form which can be readily dispersed in water without the need for mechanical or chemical dispersing aids and with minimum attention of the operator. Other objects and advantages of the invention will become apparent from the following detailed description thereof, and include the provision of a hydrophilic carbon black which imparts lower than normal viscosities to aqueous dispersions in which it is incorporated, and which may therefore, be readily formed into aqueous dispersions over a broad range of concentrations.

Briefly, in accordance with the present invention, carbon blacks characterized by outstanding hydrophilic properties, as evidenced by a capillary rise of above about 7 when tested by the previously-described test, may be economically produced by treating carbon black with sodium hypochlorite in aqueous solution, the amount of sodium hypochlorite being carefully controlled and determined by both the weight of carbon black subjected to treatment and the available surface area, as measured by the well-known B.E.T. method, of the black. The reaction is permitted to proceed for a specified period of time, and thereafter the hydrophilic carbon black is separated from the reaction mixture and, advantageously, residual electrolytes removed therefrom. According to a specific embodiment of the invention, the hydrophilic carbon black may be dried to produce a free flowing carbon black product which is readily dispersible in water.

More specifically, I have found that the proportion by weight of sodium hypochlorite to carbon black should exceed about 0.4 and may be as high as 5.25 or more. In most cases, a particularly satisfactory range from the standpoints of both economy and optimum property development is from about 0.5 to 4.2.

I have further found that the amount of sodium hypochlorite required to produce a carbon black having excellent hydrophilic properties is dependent not only on the weight of carbon black subjected to treatment, but also on the available surface area of the carbon black as measured by the well-known B.E.T. method. Generally, the weight of sodium hypochlorite in grams per square meter of carbon black surface should be at least $2 \times 10^{-3}$. It is generally not necessary to use more than $5 \times 10^{-3}$ grams of sodium hypochlorite per square meter of black surface since additional advantages in properties are not obtained. In practice, the preferred range is from about $3 \times 10^{-3}$ to about $4 \times 10^{-3}$ g./m.$^2$.

The mean particle diameter, measured by the electron microscope, of the carbon black which I subject to treatment is also an important consideration, and should be below 100 m$\mu$, as otherwise the treated carbon black cannot be dispersed in water to form stable aqueous dispersions. When tested according to the previously-described test for hydrophilicity, treated carbon blacks having a particle size of above 100 m$\mu$ do not show a capillary rise. I have found the class of carbon blacks known as oil furnace blacks to be particularly satisfactory starting materials.

In carrying out the treatment process, carbon black is mixed with an aqueous solution of sodium hypochlorite in an amount previously-noted, and the reaction mixture is subjected to agitation for a period of time of from about 5 minutes to 2½ hours. The concentration of the sodium hypochlorite solution employed may, with advantage, vary from 0.25% to 15%. The reaction is exothermic, liberating approximately 50 Kcal. of heat per mol of sodium hypochlorite reacted. When the reaction is initiated at room temperature, reaction temperatures have, for example, been observed to rise to within the range of 30° to 60° C. with the peak temperature generally occurring with about 10 minutes to one hour after initiation, depending on the particular carbon black subjected to treatment and the quantities of reactants.

The pH of the reaction mixture upon completion of the reaction is determined primarily by the amount of sodium hypochlorite reacted. In accordance with my process, wherein, as previously noted, an aqueous mixture of carbon black and sodium hypochlorite in carefully controlled proportions is subjected to agitation, the pH of the reaction mixture upon completion of the reaction is below about 7, and may even be as low as 3.0, or lower. This acidic pH, which is characteristic of my process, is due to the formation of chloride electrolytes, i.e., HCl and NaCl, in the reaction mixture.

Although not completely essential, I have found that it is desirable that these electrolytes and any unreacted sodium hypochlorite be removed from the hydrophilic carbon black product. Removal may be accomplished by any of several methods. A particularly satisfactory purification method involves transfer of the electrolytes and unreacted sodium hypochlorite through a membrane by dialysis. When the concentration of electrolytes is not too high, I have effected purification by merely decanting the bulk of the aqueous medium from the black. Of course, washing and filtration operations may also be employed.

Although the hydrophilic carbon black product may be recovered from the reaction mixture as a concentrated paste which will readily disperse in water to form stable aqueous dispersions, I have found that when the carbon black is adequately treated, in accordance with the present process, the wet black or paste may be subjected to drying operations with little or no detriment to its hydrophilic characteristics. This, of course, is advantageous in that it permits the production of free-flowing carbon black powders which are autodispersing in aqueous medium, and which may be shipped and stored at greatly reduced costs. Free-flowing hydrophilic carbon black powders may be prepared, for example, by heating the carbon black at temperatures of from 100° to 115° C. to reduce the moisture content thereof. If desired, the carbon black pastes may be dried without heating, by means of dialysis whereby the water is transferred through a membrane into a liquid desiccant, such as acetone, or by centrifugation.

My present process should not be confused with the process disclosed and claimed by U.S. Patent 2,439,442 issued to Fred H. Amon et al. According to this patent, carbon black is treated with sodium hypochlorite by forming a reaction mixture consisting of 100 grams of carbon black, 300 cc. of a 10% sodium hypochlorite solution and 300 cc. of water. This mixture, which forms a sludge having a pH of 8 to 9, is allowed to stand for about 24 hours. Thereafter, the sludge is acidified to a pH of about 2 with hydrochloric acid and the excess hydrochloric acid and sodium chloride are removed by washing. The hydrophilic carbon black is recovered in paste form, since, according to the patent, if the carbon black is completely dried, its dispersibility in water is lost or substantially reduced.

As previously described, the amount of sodium hypochlorite employed to treat carbon black, in accordance with my process, is dependent upon the weight and total available surface area of the carbon black. The reaction mixture resulting from this treatment has a pH which is acidic, rather than alkaline, in nature. Further, the reaction times which I employ to render carbon black hydrophilic are less than 2 to 2½ hours, and following the reaction, I do not acidify the reaction sludge. Also, as previously noted, when the carbon black is treated in accordance with the most preferred conditions of my process, the hydrophilic carbon black product may be subjected to drying operations without detrimentally affecting its hydrophilic properties.

As previously noted, the hydrophilic carbon blacks produced by my treatment process are readily dispersible in aqueous medium over a wide range of concentrations without the need for mechanical or chemical dispersing aids. When tested by the above-described capillary rise test, carbon blacks treated in accordance with my present invention, show a capillary rise of over 7 centimeters, indicative of outstanding hydrophilicity.

Another remarkable characteristic of the hydrophilic blacks of this invention is their exceptional affinity for cellulosic and like materials, including cotton, rayon, and paper. For example, newsprint, marked with an aqueous ink of the treated black cannot be removed by water washing or even with dilute calcium hypochlorite solution once the aqueous medium of the ink has evaporated. On the other hand, according to the above-noted Amon et al. patent, inks formed from the hydrophilic blacks prepared in accordance therewith, can be washed from newsprint by a dilute calcium hypochlorite solution.

The invention and advantages thereof will now be further described by the following specific illustrations which are not to be interpreted as limitative.

*Example 1*

In this illustration an oil furnace carbon black known as "Neotex 130," and having a mean particle diameter of 17 m$\mu$. and a B.E.T. surface area of about 200 m.$^2$/g. was treated with incremental amounts of sodium hypochlorite. Treating solutions were formed from a 5.25% sodium hypochlorite solution and water. One gram samples of the carbon black were added to each of the treating solutions, and the reaction was accomplished by vigorously agitating the reaction mixtures in 150 ml. flasks on a tumbling machine for a period of two hours. The temperatures of the reaction mixtures during this period were observed to be about 35–40° C.

The pH's of the sodium hypochlorite solutions before addition of the carbon black and the pH's of the reaction mixtures after the tumbling period were determined and are reported in Table 1, below.

After tumbling, the reaction mixtures were sealed in cellulose dialysis bags and immersed in running water for 24 hours to remove the bulk of the electrolytes formed by the reaction through the walls of the bags. After this purification step, the mixtures, which were found to have a pH of about 7, were placed, while still sealed in the dialysis bags, in acetone for 24 hours. Water was removed from the treated blacks by transfer through the bag walls into the acetone.

The carbon blacks, upon removal from the dialysis bags, were found to have moisture contents of between 1% to 2%. Trace amounts of acetone on the blacks were removed by exposing the blacks to atmospheric drying overnight. The treated and dried blacks had the appearance of irregularly shaped granules which were easily pulverized into a free flowing powder.

One gram of each of the powdered carbon samples was added to 100 ml. of water, and the mixtures agitated in stoppered flasks by tumbling for one hour. Examination of the mixtures after tumbling revealed that the hypochlorite treated blacks were discretely dispersed throughout the water and that chloride ion was present only in trace amounts.

Ten ml. of each of these dispersions were added to 15 ml. of water in 50 ml. beakers to form 0.4% dispersions which were tested in accordance with the above-described capillary rise test. The beakers were placed in a closed vessel containing a rack from which strips of chromatography paper were hung vertically. The paper employed in this test was Whatman No. 3MM cut to ½ inch widths. The lower ends of the papers were immersed in the carbon black dispersions. After 24 hours, the strips were removed, and the distances, in centimeters, of capillary rise above the liquid level were measured.

The treating conditions and results of the capillary rise test were as follows:

On the basis of numerous experiments, and as shown by Examples 1 and 2, I have found that the optimum treatment level, as evidenced by a leveling off in capillary rise, occurs when the weight of sodium hypochlorite per square meter of carbon black surface is about $4 \times 10^{-3}$ g./m.$^2$.

It will also be noted from the results set forth in Tables 1 and 2, that when carbon black was treated in accordance with the conditions of the present invention, the reaction mixtures had pH values of below 7.

TABLE 1

| Expt. No. | Grams NaOCl / Grams Black | Grams NaOCl / m.² Black Surface | pH of Treating Solution | pH of Reaction Mixture | Capillary Rise (cm.) |
|---|---|---|---|---|---|
| 1 | 0 | | | | 0 |
| 2 | 0.1 | $5 \times 10^{-4}$ | 9.3 | 7.7 | 5.4 |
| 3 | 0.2 | $1 \times 10^{-3}$ | 9.5 | 7.2 | 6.0 |
| 4 | 0.3 | $1.5 \times 10^{-3}$ | 9.6 | 7.1 | 6.3 |
| 5 | 0.4 | $2 \times 10^{-3}$ | 9.6 | 6.8 | 8.0 |
| 6 | 0.5 | $2.5 \times 10^{-3}$ | 9.7 | 6.7 | 9.6 |
| 7 | 0.6 | $3 \times 10^{-3}$ | 9.8 | 6.6 | 9.9 |
| 8 | 0.7 | $3.5 \times 10^{-3}$ | 9.9 | 6.5 | 9.0 |
| 9 | 0.8 | $4 \times 10^{-3}$ | 10.1 | 6.5 | 9.7 |
| 10 | 0.9 | $4.5 \times 10^{-3}$ | 10.2 | 6.4 | 9.2 |
| 11 | 1.05 | $5.3 \times 10^{3}$ | 10.3 | 6.3 | 10.2 |

The above results show that in order to impart a substantial degree of hydrophilicity to carbon black, as indicated by a capillary rise of above 7 cm. for a 0.4% aqueous dispersion of the black, the weight proportion of sodium hypochlorite to black should be above about 0.4 and the proportion of grams of sodium hypochlorite to square meters of black surface should be above about $2 \times 10^{-3}$.

*Example 2*

In this illustration an experimentally produced oil furnace carbon black having a mean particle size of 10 m$\mu$ and a B.E.T. surface area of about 1000 m.$^2$/g. was treated with sodium hypochlorite and tested for hydrophilicity using the same conditions and methods described in Example 1.

Further advantages afforded by the invention are the lowering of viscosity and yield value of aqueous dispersions in which the black is incorporated. The following example compares the properties of aqueous dispersions of the dried hydrophilic carbon black of Experiment No. 6 and the purified hydrophilic carbon black paste of Experiment No. 6 with aqueous dispersions of the untreated carbon black of Example 1.

*Example 3*

Dispersions of 5, 10, 15 and 20% carbon black, by weight, were prepared from each of the above-noted carbon black samples with and without a lignin sulfonic acid type dispersing agent.

Charges, prepared according to the formulations set

TABLE 2

| Expt. No. | Grams NaOCl / Grams Black | Grams NaOCl / m.² Black Surface | pH of Treating Solution | pH of Reaction Mixture | Capillary Rise (cm.) |
|---|---|---|---|---|---|
| 12 | 0 | | | | 0 |
| 13 | 0.1 | $1 \times 10^{-4}$ | 9.2 | 7.0 | 0 |
| 14 | 0.2 | $2 \times 10^{-4}$ | 9.3 | 6.3 | 0 |
| 15 | 0.3 | $3 \times 10^{-4}$ | 9.4 | 6.2 | 0 |
| 16 | 0.4 | $4 \times 10^{-4}$ | 9.4 | 6.2 | 0 |
| 17 | 0.5 | $5 \times 10^{-4}$ | 9.5 | 5.7 | 0 |
| 18 | 0.6 | $6 \times 10^{-4}$ | 9.6 | 4.7 | 0 |
| 19 | 0.7 | $7 \times 10^{-4}$ | 9.7 | 4.6 | 0 |
| 20 | 0.8 | $8 \times 10^{-4}$ | 9.8 | 4.0 | 0 |
| 21 | 0.9 | $9 \times 10^{-4}$ | 9.8 | 3.7 | 0 |
| 22 | 1.05 | $1 \times 10^{-3}$ | 10.2 | 3.4 | 0 |
| 23 | 2.10 | $2.1 \times 10^{-3}$ | 10.6 | 3.1 | 10.5 |
| 24 | 3.15 | $3.15 \times 10^{-3}$ | 11.0 | 2.9 | 26 |
| 25 | 4.20 | $4.2 \times 10^{-3}$ | 11.2 | 2.9 | 35 |
| 26 | 5.25 | $5.25 \times 10^{-3}$ | 11.6 | 3.4 | 35 |

As shown by the above results, the amount of sodium hypochlorite required to produce a carbon black having excellent hydrophilic properties is dependent on both the weight of carbon black subjected to treatment and the available surface area of the black. Thus, in order to render the carbon black of Example 2 hydrophilically equivalent to that of Example 1, it was necessary to use a weight ratio of sodium hypochlorite to carbon black which was twice as great, since the available surface area of the black of Example 2 was much greater than that of Example 1. Even more desirable results were obtained when the amount of hypochlorite used was three or more times greater than that employed in Example 1.

forth in Table 3 below, were weighed into steel containers having a volume of 150 cc. 350 grams of ⅛" steel shot was added to the containers, and the containers were sealed and agitated for 15 minutes on a shaking machine to grind the charge. The contents of each container was then screened through 10 x 10 mesh screens, collected and weighed. Viscosity and yield values were determined 16 hours after screening.

The formulations employed and the yield and viscosity values, determined at 23° C. with a Brookfield Viscometer after 10 revolutions of a No. 2 spindle turning at 30 r.p.m., are set forth in the following tabulation. All weights are in grams.

TABLE 3

| Formulations | With Additives | | Without Additives | |
|---|---|---|---|---|
| Carbon black | Varied | | Varied | |
| Lignin sulfonic acid type dispersant | 1 | | | |
| NaOH | 0.1 | | | |
| H²O | 40.0 | | 40.0 | |
| Dispersion Properties | Yield (Percent) | Viscosity (cps.) | Yield (Percent) | Viscosity (cps.) |
| 5% Dispersion: | | | | |
| Untreated Black | 90 | 4 | 64 | (¹) |
| Hydrophilic Black Paste | 98 | 5 | 83 | 14 |
| Dried Hydrophilic Black | 92 | 4 | 82 | 10 |
| 10% Dispersion: | | | | |
| Untreated Black | 89 | 5 | 52 | (¹) |
| Hydrophilic Black Paste | 93 | 6 | 87 | 60 |
| Dried Hydrophilic Black | 92 | 6 | 86 | 70 |
| 15% Dispersion: | | | | |
| Untreated Black | 78 | 710 | Gelled | |
| Hydrophilic Black Paste | 90 | 32 | 88 | 80 |
| Dried Hydrophilic Black | 91 | 10 | 85 | 75 |
| 20% Dispersion: | | | | |
| Untreated Black | Gelled | | Gelled | |
| Hydrophilic Black Paste | 89 | 32 | 86 | 80 |
| Dried Hydrophilic Black | 89 | 16 | 85 | 300 |

¹ Not dispersed.

As can be readily seen from the above results, the hydrophilic carbon blacks of the present invention formed less viscous aqueous dispersions in identical formulations than did the untreated control.

In order to disperse the untreated control it was necessary to use a dispersing agent, and even then, dispersions higher than about 15% black could not be prepared. No additives were required, on the other hand, to form good dispersions of the treated blacks. Dried films of dispersions formed from the treated blacks were observed to have a much higher gloss than those formed from the control even when the degree of dispersion appeared to be equivalent.

The lower than normal viscosities imparted to aqueous dispersions in which my hydrophilic carbon black is incorporated permits the preparation of stable dispersions at unusually high concentrations of carbon black, for instance, 40 to 50%.

I claim:

1. Method for producing a carbon black having outstanding hydrophilic characteristics which comprises forming a reaction mixture of a carbon black having an average particle size of below about 100 m$\mu$ and an aqueous solution of sodium hypochlorite wherein the weight proportion of sodium hypochlorite to carbon black is at least 0.4 and the weight of sodium hypochlorite per square meter of carbon black surface measured by the B.E.T. method is at least $2 \times 10^{-3}$ g./m.², subjecting the reaction mixture to agitation for a period of time of from about 5 minutes to 2½ hours to effect reaction between the carbon black and the sodium hypochlorite, the reaction mixture upon completion of the reaction having a pH of below about 7, and drying said carbon black to a moisture content below about 2%.

2. Method as in claim 1, wherein the weight proportion of sodium hypochlorite to carbon black is within the range of 0.4 to 5.25 and the weight of sodium hypochlorite per square meter of carbon black surface is within the range of $2 \times 10^{-3}$ to $5 \times 10^{-3}$ g./m.².

3. Method as in claim 1, wherein the carbon black is an oil furnace black.

4. Method as in claim 2, wherein the weight proportion of sodium hypochlorite to carbon black is within the range of from 0.5 to 4.2 and the weight of sodium hypochlorite per square meter of carbon black surface is within the range of $3 \times 10^{-3}$ to $4 \times 10^{-3}$.

5. Method for producing a carbon black having outstanding hydrophilic characteristics which comprises forming a reaction mixture of a carbon black having an average particle size of below about 100 m$\mu$ and an aqueous solution of sodium hypochlorite wherein the weight proportion of sodium hypochlorite to carbon black is within the range of 0.4 to 5.25 and the weight of sodium hypochlorite per square meter of carbon black surface measured by the B.E.T. method is within the range of $2 \times 10^{-3}$ to $5 \times 10^{-3}$, subjecting the reaction mixture to agitation for a period of time of from about 5 minutes to 2½ hours to effect reaction between the carbon black and the sodium hypochlorite, the reaction mixture upon completion of the reaction having a pH of below about 7, purifying the hydrophilic carbon black by removing therefrom residual sodium hypochlorite and electrolyte formed by the reaction, and drying said carbon black to a moisture content below about 2%.

6. Method as in claim 5, wherein the residual sodium hypochlorite and the electrolyte formed by the reaction are removed by dialysis.

7. Method as in claim 5, wherein the purified hydrophilic carbon black is dried to a free flowing form.

References Cited

UNITED STATES PATENTS

| 2,439,442 | 4/1948 | Amon et al. | 23—209.1 |
| 2,641,533 | 6/1953 | Cines et al. | 23—209.1 |
| 2,674,440 | 4/1954 | Donovan | 210—22 X |

OTHER REFERENCES

Drogin, "Developments and Status of Carbon Black," United Carbon Co., Inc. (1945), Charlestown, W.Va., p. 90.

OSCAR R. VERTIZ, *Primary Examiner.*

EDWARD J. MEROS, *Examiner.*